(12) United States Patent
Ohkawa et al.

(10) Patent No.: US 12,554,521 B2
(45) Date of Patent: Feb. 17, 2026

(54) INFORMATION PROCESSING APPARATUS, INFORMATION PROCESSING SYSTEM, AND METHOD OF CONTROLLING INFORMATION PROCESSING APPARATUS

(71) Applicant: Fujitsu Limited, Kawasaki (JP)

(72) Inventors: Naoyoshi Ohkawa, Kawasaki (JP); Hiroshi Tomonaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 18/322,833

(22) Filed: May 24, 2023

(65) Prior Publication Data

US 2024/0069941 A1  Feb. 29, 2024

(30) Foreign Application Priority Data

Aug. 29, 2022 (JP) ................. 2022-135952

(51) Int. Cl.
| | |
|---|---|
| G06F 9/455 | (2018.01) |
| H04L 41/50 | (2022.01) |
| H04L 67/2866 | (2022.01) |
| H04L 67/50 | (2022.01) |
| H04L 67/51 | (2022.01) |
| H04L 67/60 | (2022.01) |

(52) U.S. Cl.
CPC .......... *G06F 9/45533* (2013.01); *H04L 41/50* (2013.01); *H04L 41/5077* (2013.01); *H04L 67/2866* (2013.01); *H04L 67/50* (2022.05); *H04L 67/51* (2022.05); *H04L 67/60* (2022.05)

(58) Field of Classification Search
None
See application file for complete search history.

(56) References Cited

U.S. PATENT DOCUMENTS

| 12,323,482 B2 * | 6/2025 | He ..................... H04L 41/5054 |
| 2016/0277292 A1 | 9/2016 | Hu et al. |
| 2020/0195526 A1 * | 6/2020 | Eberlein ............... G06F 9/5061 |
| 2023/0046979 A1 * | 2/2023 | Jiang .................... H04L 67/141 |

FOREIGN PATENT DOCUMENTS

| JP | 2016-152464 A | 8/2016 |
| JP | 2017-507374 A | 3/2017 |

\* cited by examiner

*Primary Examiner* — Qing Yuan Wu
(74) *Attorney, Agent, or Firm* — ArentFox Schiff LLP

(57) ABSTRACT

An information processing apparatus includes a logic circuit provided with a processing function performing a microservice, a service mesh functional circuit and a pseudo application. The logic circuit starts processing of a service that uses the request data, generates a pseudo request for a control plane communication, transmits the generated pseudo request to the pseudo application, and transmits a processing completion notification to the pseudo application based on completion of the processing of the service by the processing function. The pseudo application transmits a pseudo response to the logic circuit based on reception of the processing completion notification after reception of the pseudo request. The service mesh functional circuit rewrites destination information included in the pseudo response and transfers the pseudo response in which the destination information has been rewritten to the logic circuit.

9 Claims, 7 Drawing Sheets

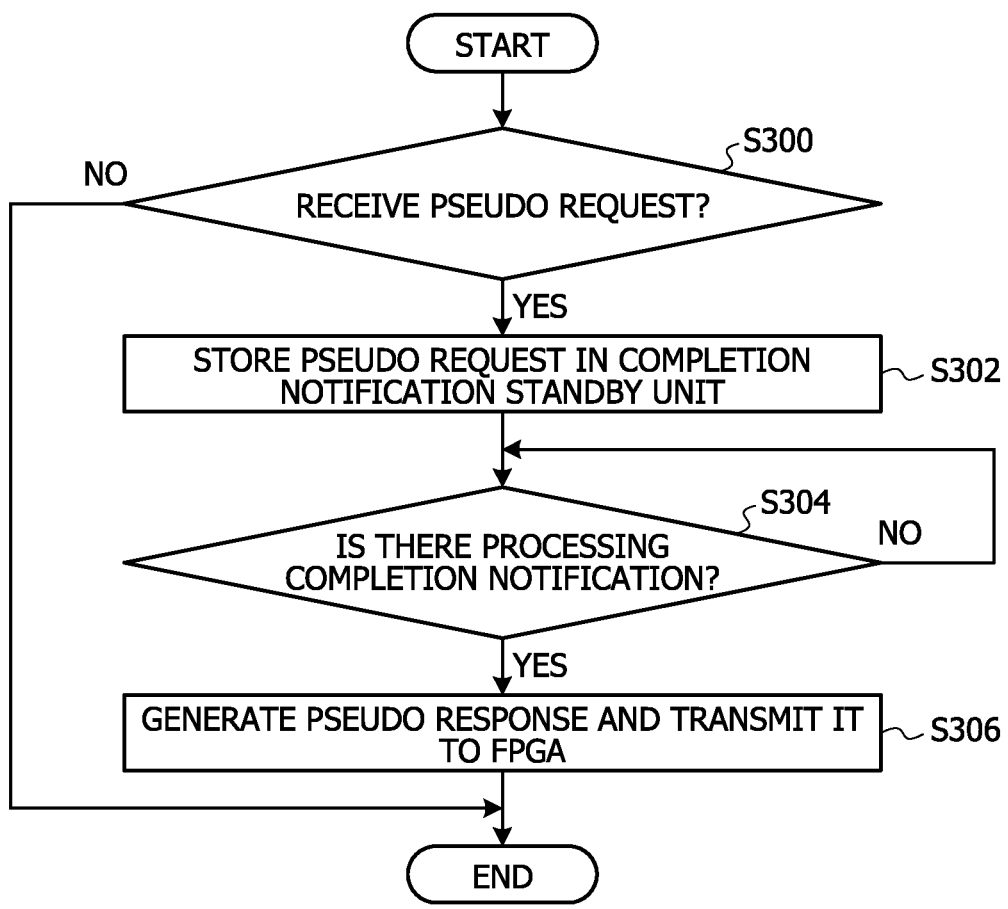

INFORMATION PROCESSING APPARATUS, INFORMATION PROCESSING SYSTEM, AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2022-135952, filed on Aug. 29, 2022, the entire contents of which are incorporated herein by reference.

FIELD

The embodiment discussed herein is related to an information processing apparatus, an information processing system, and an information processing apparatus control method.

BACKGROUND

There is known a network service apparatus equipped with a field-programmable gate array (FPGA) that has an interface for transmitting and receiving packets and a plurality of service processing resources and distributes the received packets to the service processing resources based on a transfer rule. As a result, the distribution of packets to a virtual space is accelerated.

There is known a virtualized network system including: a network interface card in which an FPGA having buffer units for respectively storing a received packet and a duplicated packet is mounted; and a network application unit that operates in a virtualized environment. The network application unit performs normal network processing and continuous monitoring respectively on one and the other of the packets stored in the buffer units, and analyzes a packet that is continuously monitored at the time of the occurrence of a fault event. As a result, a fault event is analyzed while suppressing the load and cost without affecting the network processing.

Japanese National Publication of International Patent Application No. 2017-507374 and Japanese Laid-open Patent Publication No. 2016-152464 are disclosed as related art.

SUMMARY

According to an aspect of the embodiments, an information processing apparatus included in an information processing system that employs a microservice architecture, the information processing apparatus comprising: a logic circuit provided with a processing function that performs processing of a microservice and a communication interface that is coupled to a network; a service mesh functional circuit that realizes a service mesh; and a pseudo application that is coupled to the logic circuit via the service mesh functional circuit and that does not have a microservice processing function, wherein the logic circuit starts, based on reception of request data for a data plane communication from a first other information processing apparatus by the communication interface, processing of a service that uses the request data by the processing function, generates a pseudo request for a control plane communication, transmits the generated pseudo request to the pseudo application, and transmits a processing completion notification to the pseudo application based on completion of the processing of the service by the processing function, the pseudo application transmits a pseudo response to the logic circuit based on reception of the processing completion notification after reception of the pseudo request, when detecting the pseudo response transmitted from the pseudo application to the logic circuit, the service mesh functional circuit rewrites destination information included in the pseudo response and transfers the pseudo response in which the destination information has been rewritten to the logic circuit, and the logic circuit generates, based on reception of the pseudo response that includes the rewritten destination information, request data for a next data plane communication while including the rewritten destination information in data after the processing of the service, and transmits the generated request data from the communication interface to a second other information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flow diagram illustrating one example of an operation of a pseudo container in FIG. 3.

DESCRIPTION OF EMBODIMENTS

For example, in a service environment of a microservice architecture, each of a plurality of servers coupled to one another via a network includes a virtual machine that performs processing of a microservice, and the virtual machine includes a Pod including an Envoy and an application container. When the processing of the microservice performed in the application container is offloaded to an FPGA, it is conceivable to cause the Envoy to manage a communication with respect to the FPGA.

However, since the Envoy is realized by software executed by a processor, throughput of the processing of the microservice by the FPGA may decrease as the Envoy intervenes, and a delay until a processing result is output may increase. On the other hand, when the Envoy is not caused to manage a communication with respect to the FPGA, the Envoy has difficulty in acquiring information regarding the processing of the microservice performed by the FPGA. As a result, it becomes difficult to realize service mesh functions such as destination control and monitoring.

In one aspect, the embodiment aims to realize a service mesh function while suppressing the lowering of throughput in processing of a microservice offloaded to a logic circuit.

Hereinafter, embodiments will be described with reference to the drawings.

Figure 1:
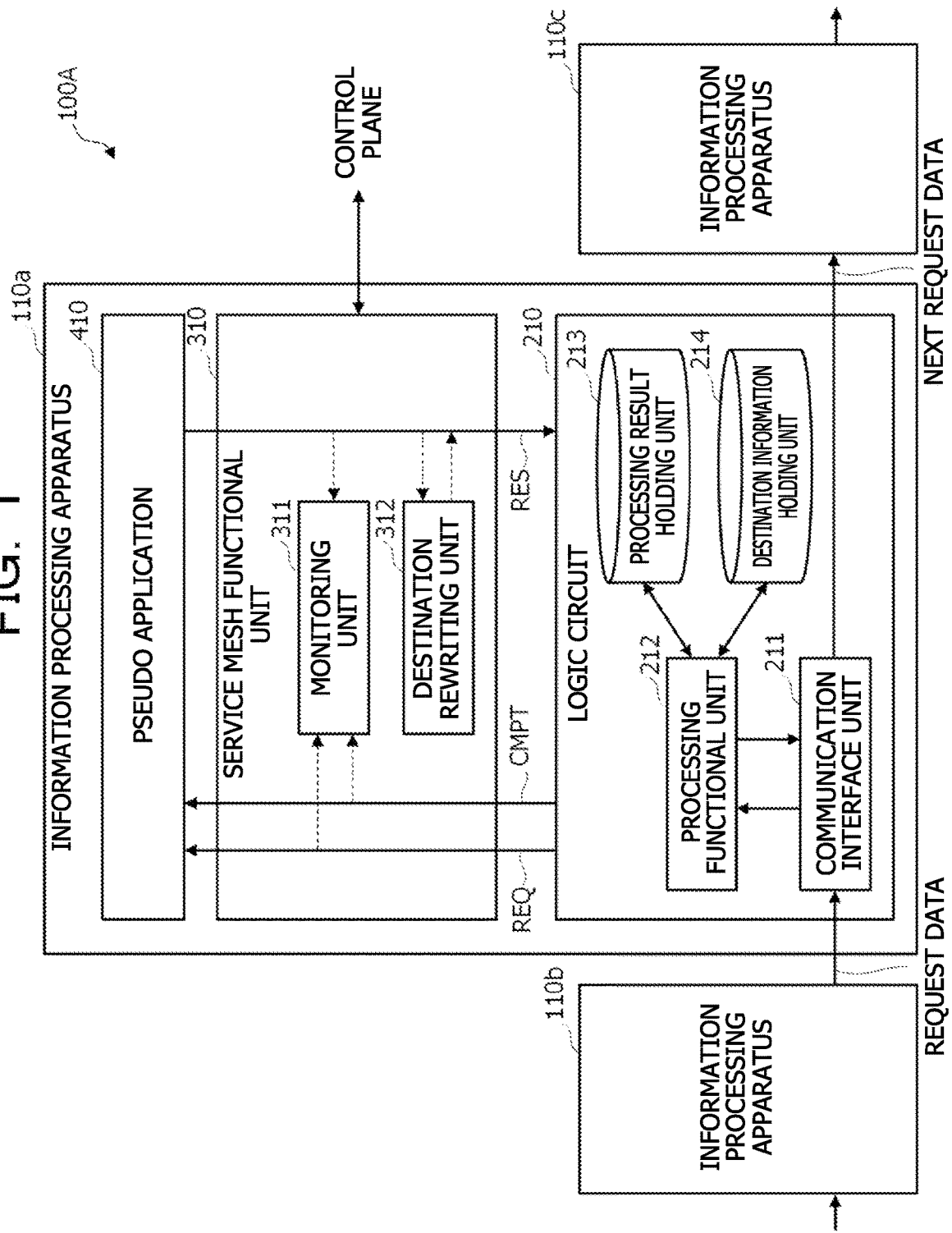
FIG. 1 is a block diagram illustrating one example of an information processing system according to one embodiment.

FIG. 1 illustrates one example of an information processing system according to one embodiment. An information processing system 100A illustrated in FIG. 1 includes a plurality of information processing apparatuses 110 (110a, 110b, 110c) coupled to one another via a network. Arrows coupled to the respective information processing apparatuses 110a, 110b, and 110c indicate a part of the network. The number of the information processing apparatuses 110 mounted in the information processing system 100A is not limited to three. The information processing apparatus 110b is one example of first other information processing apparatus, and the information processing apparatus 110c is one example of second other information processing apparatus.

The information processing system 100A employs, for example, a microservice architecture which provides a function of performing processing of a microservice to each information processing apparatus 110 and couples a plurality of microservices via a network to cause them to cooperate with one another. Furthermore, although not particularly limited, Istio, for example, is used as a platform for a service mesh that manages the coupling between the microservices. The configuration illustrated in FIG. 1 represents a data plane of the service mesh.

The information processing apparatus 110a includes a logic circuit 210, a service mesh functional unit 310, and a pseudo application 410 having no microservice processing function. For example, the service mesh functional unit 310 and the pseudo application 410 are realized as a virtual machine by software executed by a processor such as a central processing unit (CPU) mounted in the information processing apparatus 110a. The logic circuit 210 is mounted in hardware such as an FPGA, and a microservice processing function is offloaded to the logic circuit 210.

The logic circuit 210 includes a communication interface unit 211, a processing functional unit 212, a processing result holding unit 213, and a destination information holding unit 214. The holding units 213 and 214 may consist of memories. The logic circuit 210 is coupled to the pseudo application 410 via the service mesh functional unit 310. The service mesh functional unit 310 includes a monitoring unit 311 and a destination rewriting unit 312. For example, the service mesh functional unit 310 has a function of a load balancer which determines an information processing apparatus 110 that is caused to process next request data and a transfer path of the next request data according to the congestion degree of the network.

The communication interface unit 211 is, for example, a network interface controller (NIC) and is coupled to another information processing apparatus 110b, 110c, or the like via the network. Based on the reception of request data for a data plane communication from the information processing apparatus 110b via the communication interface unit 211, the processing functional unit 212 starts the processing of the microservice using the request data.

The logic circuit 210 generates a pseudo request REQ for a control plane communication based on the start of the processing of the microservice using the request data by the processing functional unit 212, and transmits the generated pseudo request REQ to the pseudo application 410. For example, the pseudo request REQ includes destination information included in the request data received from the information processing apparatus 110b. The destination information includes, for example, a destination address and indicates a transmission destination of next request data to be transmitted by the information processing apparatus 110a. The pseudo application 410 receives the pseudo request REQ.

The monitoring unit 311 in the service mesh functional unit 310 monitors information transferred between the logic circuit 210 and the pseudo application 410. When detecting the pseudo request REQ transmitted from the logic circuit 210 to the pseudo application 410, the monitoring unit 311 holds the time of detection as the microservice processing start time. Furthermore, when detecting the pseudo request REQ, the monitoring unit 311 adds up the number of microservice processing starts.

In addition, the service mesh functional unit 310 may calculate the number of microservice processing starts per predetermined time (for example, per minute) as the request data receiving frequency or the microservice processing frequency. For example, one or a plurality of the microservice processing start time, the number of microservice processing starts, and the microservice processing frequency detected or calculated by the service mesh functional unit 310 may be acquired by a control plane.

The logic circuit 210 transmits a processing completion notification CMPT to the pseudo application 410 based on the completion of the processing of the microservice by the processing functional unit 212. Furthermore, when destination information corresponding to data after the processing of the microservice is held in the destination information holding unit 214, the logic circuit 210 acquires the destination information held in the destination information holding unit 214 based on the completion of the processing of the microservice.

Then, the logic circuit 210 generates request data for a next data plane communication while including the acquired destination information in the data after the processing of the microservice, and transmits the generated request data to the information processing apparatus 110c. Therefore, when destination information rewritten by the service mesh functional unit 310 is held in the destination information holding unit 214, the logic circuit 210 may transmit next request data to the information processing apparatus 110c without waiting for the reception of a pseudo response RES. Accordingly, it is possible to improve throughput in the processing of the microservice and reduce a delay until a processing result of the microservice is output.

On the other hand, when the destination information corresponding to the data after the processing of the microservice is not held in the destination information holding unit 214, the logic circuit 210 stores the data after the processing of the microservice in the processing result holding unit 213.

The pseudo application 410 transmits the pseudo response RES to the logic circuit 210 based on the reception of the processing completion notification CMPT after the reception of the pseudo request REQ. As described above, the pseudo application 410 has only a function of receiving the pseudo request REQ and the processing completion notification CMPT and a function of transmitting the pseudo response RES responding to the reception of the processing completion notification CMPT.

When detecting the pseudo response RES transmitted from the pseudo application 410 to the logic circuit 210, the monitoring unit 311 of the service mesh functional unit 310 holds the time of detection as the microservice processing completion time. Note that the service mesh functional unit 310 may hold the time of detecting the processing completion notification CMPT from the logic circuit 210 as the microservice processing completion time.

The monitoring unit 311 calculates time from the start time to the completion time as microservice processing time. Furthermore, when detecting the pseudo response RES, the monitoring unit 311 adds up the number of the microservice processing completions as the number of microservice processing successes.

The destination rewriting unit 312 of the service mesh functional unit 310 rewrites destination information included in the pseudo response RES to appropriate destination information based on the reception of the pseudo response RES by the monitoring unit 311. Then, the destination rewriting unit 312 transfers, to the logic circuit 210, the pseudo response RES in which the destination information has been rewritten to the appropriate destination information. By rewriting the destination information by the service mesh functional unit 310, it is possible to appropriately set a transfer path of next request data and suppress the lowering of the microservice processing efficiency.

Note that the monitoring unit 311 may calculate a success rate or a failure rate of the processing of the microservice by calculating a ratio between the number of completions and the number of starts. For example, one or a plurality of the completion time, the processing time, the number of completions, the success rate (failure rate) of the microservice, and the rewritten destination information detected or calculated by the monitoring unit 311 may be acquired by the control plane.

When data after the processing of the microservice is not transmitted to the information processing apparatus 110c, the logic circuit 210 extracts the data after the processing held in the processing result holding unit 213 based on the reception of the pseudo response RES including the rewritten destination information. The logic circuit 210 generates request data for a next data plane communication while including the rewritten destination information in the extracted data after the processing. The logic circuit 210 transmits the generated request data from the communication interface unit 211 to the other information processing apparatus 110c. Furthermore, the logic circuit 210 stores the rewritten destination information included in the pseudo response RES in the destination information holding unit 214 based on the reception of the pseudo response RES.

As described above, in the present embodiment, by offloading a microservice processing function using request data to the logic circuit 210 without mounting the microservice processing function in an application in a virtual machine, it is possible to perform the processing of the microservice without the intervention of the service mesh functional unit 310.

The logic circuit 210 and the pseudo application 410 are coupled to each other via the service mesh functional unit 310. Therefore, the service mesh functional unit 310 may detect the pseudo request REQ, the processing completion notification CMPT, and the pseudo response RES, and may acquire request data and information regarding the processing of the microservice.

For example, the service mesh functional unit 310 may detect the microservice processing start time based on the pseudo request REQ, and may detect the microservice processing completion time based on the pseudo response RES. Then, the service mesh functional unit 310 may calculate the microservice processing time based on the start time and the completion time. In addition, the service mesh functional unit 310 may add up the number of microservice processing starts and the number of microservice processing successes.

Then, the control plane may appropriately update the control function of the service mesh by acquiring the information regarding the processing of the microservice acquired or calculated by the service mesh functional unit 310. As a result, it is possible to realize a service mesh function while suppressing the lowering of throughput in the processing of the microservice offloaded to the logic circuit 210.

Since it is possible to realize the service mesh function while suppressing the lowering of the processing of the microservice, it is possible to improve the processing performance of the information processing apparatuses 110 included in the microservice architecture. Therefore, it is possible to improve the performance of the information processing system 100A operating in an environment of the microservice architecture. For example, it is possible to improve the performance of various platforms, data centers, or clouds operating in the environment of the microservice architecture.

The service mesh functional unit 310 rewrites the destination information based on the detection of the pseudo response RES. When the destination information is not held in the destination information holding unit 214, the logic circuit 210 stores data after the processing of the microservice in the processing result holding unit 213, and waits for the pseudo response RES from the pseudo application 410. Therefore, even when the processing functional unit 212 is offloaded, it is possible to acquire the destination information to be rewritten by the destination rewriting unit 312, and transmit next request data. For example, it is possible to appropriately set the transfer path of the next request data, and suppress the lowering of the microservice processing efficiency.

When destination information is held in the destination information holding unit 214, the logic circuit 210 may generate next request data without waiting for the pseudo response RES, and thus, it is possible to improve throughput in the processing of the microservice.

Figure 2:
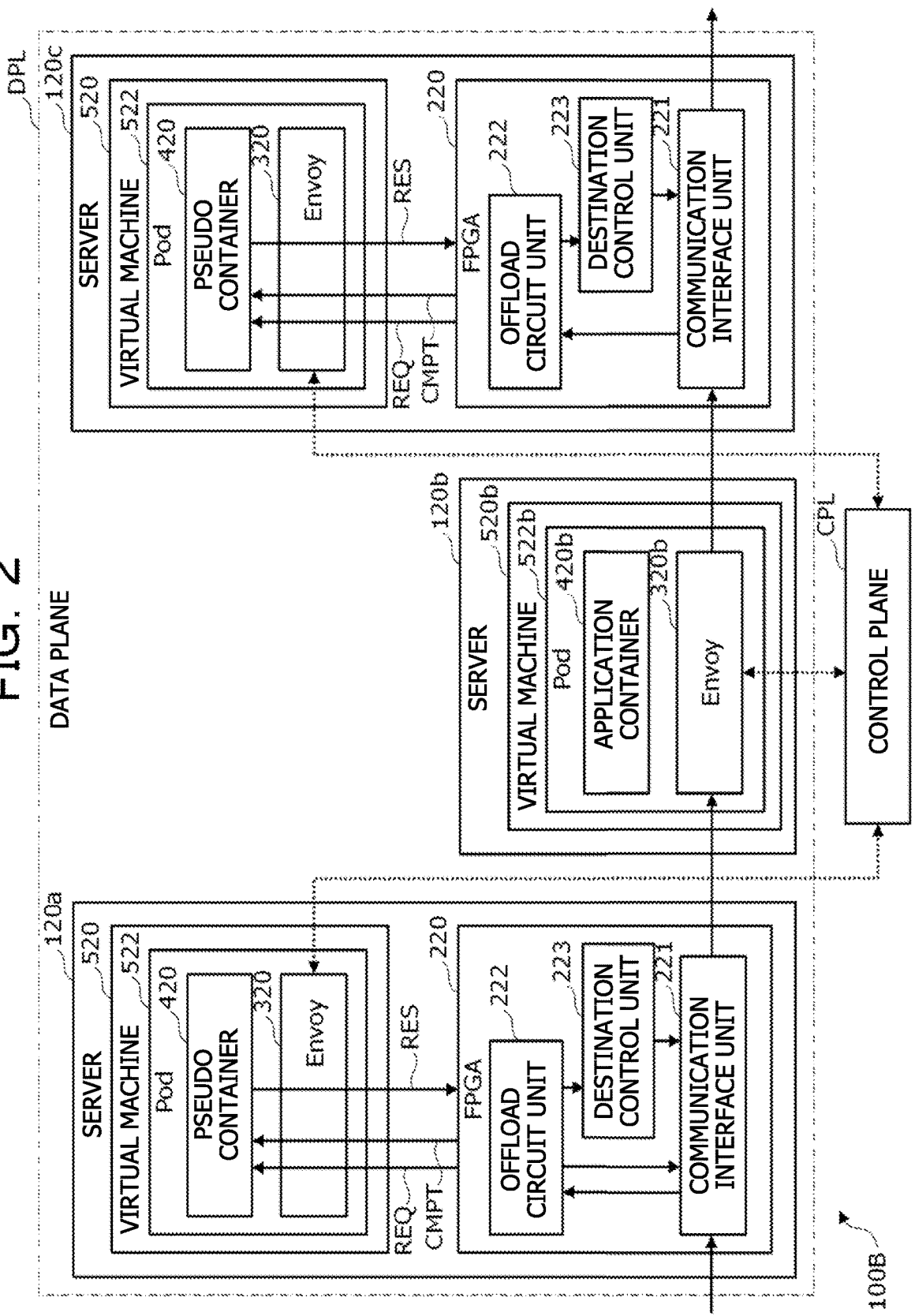
FIG. 2 is a block diagram illustrating one example of an information processing system according to another embodiment.

FIG. 2 illustrates one example of an information processing system according to another embodiment. As for components identical to or similar to those in FIG. 1, a detailed description will be omitted. An information processing system 100B illustrated in FIG. 2 includes a plurality of servers 120 (120a, 120b, 120c) coupled to one another via a network. Arrows coupled to the respective servers 120a, 120b, and 120c indicate a part of the network. The servers 120a, 120b, and 120c and the network coupling the servers 120a, 120b, and 120c to one another represents a data plane DPL in the service mesh.

The server 120 is one example of the information processing apparatus. The server 120b is one example of the second other information processing apparatus that receives request data from the server 120a, or the first other information processing apparatus that transmits request data to the server 120c. The number of the servers 120 mounted in the information processing system 100B is not limited to three. Since the servers 120a and 120c have configurations identical to each other and have functions identical to each other, the configuration and function of the server 120a will be described below.

Similarly to the information processing system 100A in FIG. 1, the information processing system 100B employs, for example, a microservice architecture that couples a plurality of microservices to be performed respectively by the servers 120 via the network to cause the microservices to cooperate with one another. Furthermore, Istio, for example, is used as a platform for the service mesh.

The server 120*a* includes an FPGA 220 and a virtual machine 520. The FPGA 220 includes a communication interface unit 221 such as an NIC, an offload circuit unit 222 to which a microservice processing function is offloaded, and a destination control unit 223. The virtual machine 520 includes a Pod 522 including a pseudo container 420 and an Envoy 320. The FPGA 220 is one example of the logic circuit. The offload circuit unit 222 is one example of the processing functional unit. The pseudo container 420 is one example of the pseudo application. The Envoy 320 is one example of the service mesh functional unit and is one type of proxy including a function of the load balancer.

The FPGA 220 is coupled to the pseudo container 420 via the Envoy 320. The communication interface unit 221 is coupled to another server 120 or the like via the network. Based on the reception of request data for a data plane communication from the another server 120 via the communication interface unit 211, the offload circuit unit 222 performs processing of the microservice using the request data.

The offload circuit unit 222 notifies the destination control unit 223 of the completion of the processing of the microservice. Based on the start of the processing of the microservice by the offload circuit unit 222, the FPGA 220 generates, for example, a Hyper Text Transfer Protocol (HTTP) request REQ for a control plane communication and transmits the HTTP request REQ to the pseudo container 420. The HTTP request REQ is one example of a pseudo request transmitted to the pseudo container 420. Hereinafter, the HTTP request REQ is also referred to as a pseudo request REQ.

The FPGA 220 transmits a processing completion notification CMPT to the pseudo container 420 based on the completion of the processing of the microservice by the offload circuit unit 222. The pseudo container 420 transmits the HTTP response RES to the FPGA 220 based on the reception of the processing completion notification CMPT after the reception of the pseudo request REQ. The HTTP response RES is one example of a pseudo response. Hereinafter, the HTTP response RES is also referred to as a pseudo response RES.

For example, similarly to the pseudo application 410 in FIG. 1, the pseudo container 420 has only a function of receiving the pseudo request REQ and the processing completion notification CMPT and a function of transmitting the pseudo response RES responding to the reception of the processing completion notification CMPT.

The Envoy 320 detects the pseudo request REQ, the processing completion notification CMPT, and the pseudo response RES, and acquires information regarding the processing of the microservice. For example, the information regarding the processing of the microservice acquired by the Envoy 320 may be acquired by a control plane CPL and used for destination control and load balancing of request data.

The Envoy 320 rewrites a destination address included in the pseudo response RES from the pseudo container 420. The destination address is one example of destination information indicating a transmission destination of next request data to be transmitted by the server 120*a* (or 120*c*).

The destination control unit 223 notifies the communication interface unit 221 of the destination address included in the pseudo response RES received from the pseudo container 420 as a transmission destination of data (next request data) processed by the offload circuit unit 222. Then, the communication interface unit 221 generates request data for a next data plane communication while including the destination address notified from the destination control unit 223 in the data processed by the offload circuit unit 222. The communication interface unit 221 transmits the generated request data to the server 120*b*.

The server 120*b* includes a virtual machine 520*b*, and the virtual machine 520*b* includes a Pod 522*b* including an Envoy 320*b* and an application container 420*b*. The Envoy 320*b* controls a communication between the servers 120, and controls the application container 420*b* in order to cause the application container 420*b* to perform the processing of the microservice using the request data received from the another server 120.

The application container 420*b* performs the processing of the microservice using the request data requested from the Envoy 320, and transfers data after the processing of the microservice to the Envoy 320. The Envoy 320 rewrites the destination address of the data after the processing to generate next request data, and transmits the generated next request data to another server 120*c*.

For example, the server 120*a* sequentially receives frame data of a moving image, decodes the received frame data to generate image data, and transmits the generated image data to the server 120*b*. Therefore, the offload circuit unit 222 of the server 120*a* has a function of decoding each frame data of the moving image.

For example, the server 120*b* corrects the luminance of the image data for each frame received from the server 120*a*, and transmits the image data after the correction to the server 120*c*. Therefore, the application container 420*b* of the server 120*b* has a function of correcting the luminance of the image data. The server 120*c* uses the image data after the correction received from the server 120*b* to perform processing of detecting an object in the image. Therefore, the offload circuit unit 222 of the server 120*c* has an image recognition function. Accordingly, it is possible to perform the image recognition processing at high speed using the microservice.

Figure 3:
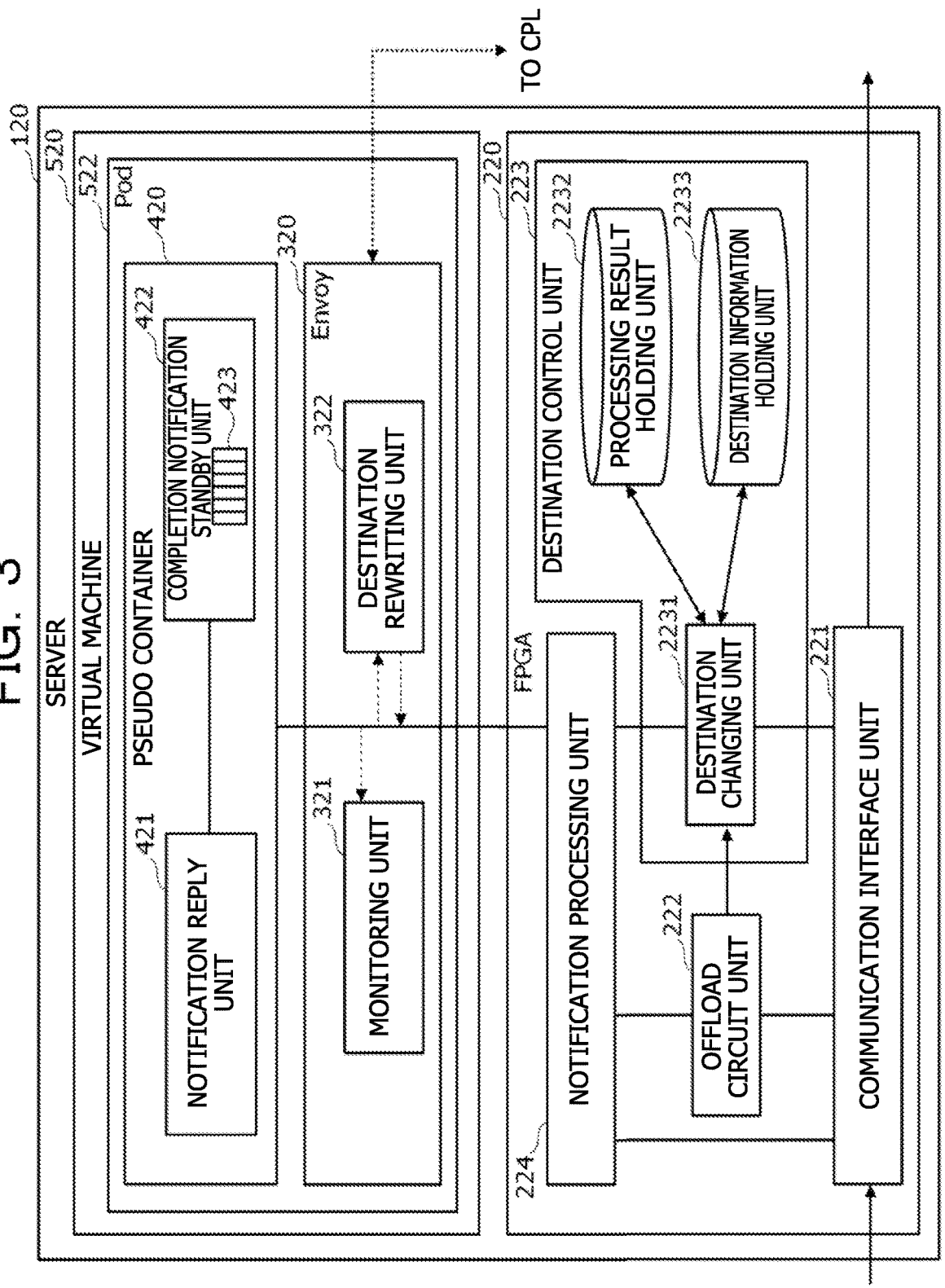
FIG. 3 is a block diagram illustrating one example of a functional configuration of a server 120a in FIG. 2.

FIG. 3 illustrates one example of a functional configuration of the server 120*a* in FIG. 2. The FPGA 220 includes a notification processing unit 224 in addition to the configuration of FIG. 2. Furthermore, the destination control unit 223 includes a destination changing unit 2231, a processing result holding unit 2232, and a destination information holding unit 2233. The configuration of the processing result holding unit 2232 is similar to the configuration of the processing result holding unit 213 in FIG. 1. The configuration of the destination information holding unit 2233 is similar to the configuration of the destination information holding unit 214 in FIG. 1.

The Envoy 320 includes a monitoring unit 321 and a destination rewriting unit 322. The pseudo container 420 includes a notification reply unit 421 and a completion notification standby unit 422. The completion notification standby unit 422 includes a queue 423 having a plurality of entries.

When starting the processing of the microservice using request data received from the communication interface unit 221, the offload circuit unit 222 outputs a processing start notification to the notification processing unit 224. When completing the processing of the microservice, the offload circuit unit 222 outputs a processing completion notification to the notification processing unit 224. Furthermore, when completing the processing of the microservice, the offload circuit unit 222 outputs data after the processing together with the processing completion notification to the destination control unit 223.

The notification processing unit 224 transmits the pseudo request REQ (FIG. 2) to the pseudo container 420 based on the start notification from the offload circuit unit 222. The notification processing unit 224 transmits the processing completion notification CMPT (FIG. 2) to the pseudo container 420 based on the completion notification from the offload circuit unit 222.

Similarly to the monitoring unit 311 in FIG. 1, the monitoring unit 321 of the Envoy 320 detects the pseudo request REQ and the processing completion notification CMPT from the notification processing unit 224, and acquires information regarding the processing of the microservice. In addition, the monitoring unit 321 detects the pseudo response RES (FIG. 2) from the pseudo container 420, and acquires information regarding the processing of the microservice. For example, the information acquired by the monitoring unit 321 includes one or a plurality of the start time, the number of starts, the completion time, the processing time, and the number of successes of the processing of the microservice.

Similar to the destination rewriting unit 312 in FIG. 1, the destination rewriting unit 322 of the Envoy 320 rewrites a destination address included in the pseudo response RES from the pseudo container 420 to an appropriate destination address.

When receiving the pseudo request REQ, the pseudo container 420 stores the received pseudo request REQ in the queue 423, associating the pseudo request REQ with the request data. When the pseudo container 420 receives the processing completion notification CMPT, the notification reply unit 421 of the pseudo container 420 extracts the pseudo request REQ corresponding to the received processing completion notification CMPT from the queue 423. The notification reply unit 421 extracts information (including a destination address) included in the extracted pseudo request REQ to generate a pseudo response RES, and transmits the generated pseudo response RES to the FPGA 220.

When receiving the pseudo response RES from the pseudo container 420, the notification processing unit 224 outputs the destination address included in the pseudo response RES to the destination changing unit 2231. When receiving a completion notification of the request data together with the data after the processing of the microservice from the offload circuit unit 222, the destination changing unit 2231 determines whether the destination address corresponding to the data after the processing is held or not in the destination information holding unit 2233. When the destination address corresponding to the data after the processing is held in the destination information holding unit 2233, the destination changing unit 2231 acquires the destination address from the destination information holding unit 2233. The destination changing unit 2231 generates request data for a next data plane communication while including the acquired destination address in the data processed by the offload circuit unit 222, and outputs the generated request data to the communication interface unit 221.

When the destination address corresponding to the data after the processing is not held in the destination information holding unit 2233, the destination changing unit 2231 stores the data after the processing received from the offload circuit unit 222 in the processing result holding unit 2232. Then, when receiving the pseudo response RES from the pseudo container 420 via the notification processing unit 224, the destination changing unit 2231 extracts the data after the processing stored in the processing result holding unit 2232. The destination changing unit 2231 generates request data for a next data plane communication while including the destination address included in the pseudo response RES in the data after the processing extracted from the processing result holding unit 2232, and outputs the generated request data to the communication interface unit 221.

The communication interface unit 221 transmits new request data received from the destination changing unit 2231 toward a destination address included in the new request data.

Figure 4:
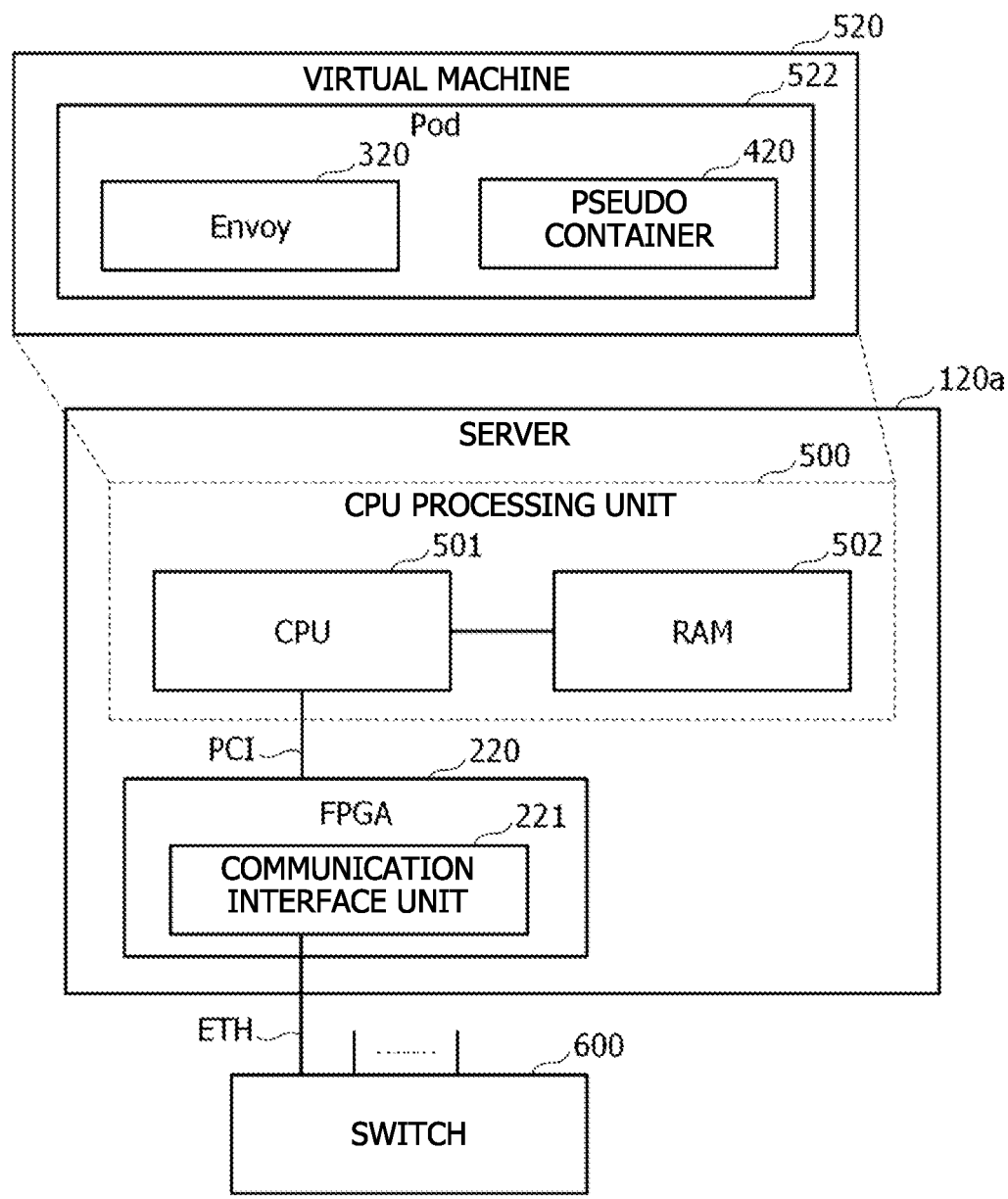
FIG. 4 is a functional block diagram illustrating one example of a hardware configuration of the server 120a in FIG. 2.

FIG. 4 illustrates one example of a hardware configuration of the server 120*a* in FIG. 2. The server 120*a* includes the FPGA 220 including the communication interface unit 221 such as an NIC, and a CPU processing unit 500. The CPU processing unit 500 includes a CPU 501 and a random access memory (RAM) 502.

Although not particularly limited, the communication interface unit 221 is coupled to a switch 600 disposed outside the server 120*a* via Ethernet (registered trademark) ETH. Furthermore, although not particularly limited, the FPGA 220 is coupled to the CPU 501 via a peripheral component interconnect (PCI) interface. Then, the CPU 501 executes a program such as a hypervisor held in the RAM 502, whereby the virtual machine 520 having the Pod 522 including the Envoy 320 and the pseudo container 420 is constructed.

Figure 5:
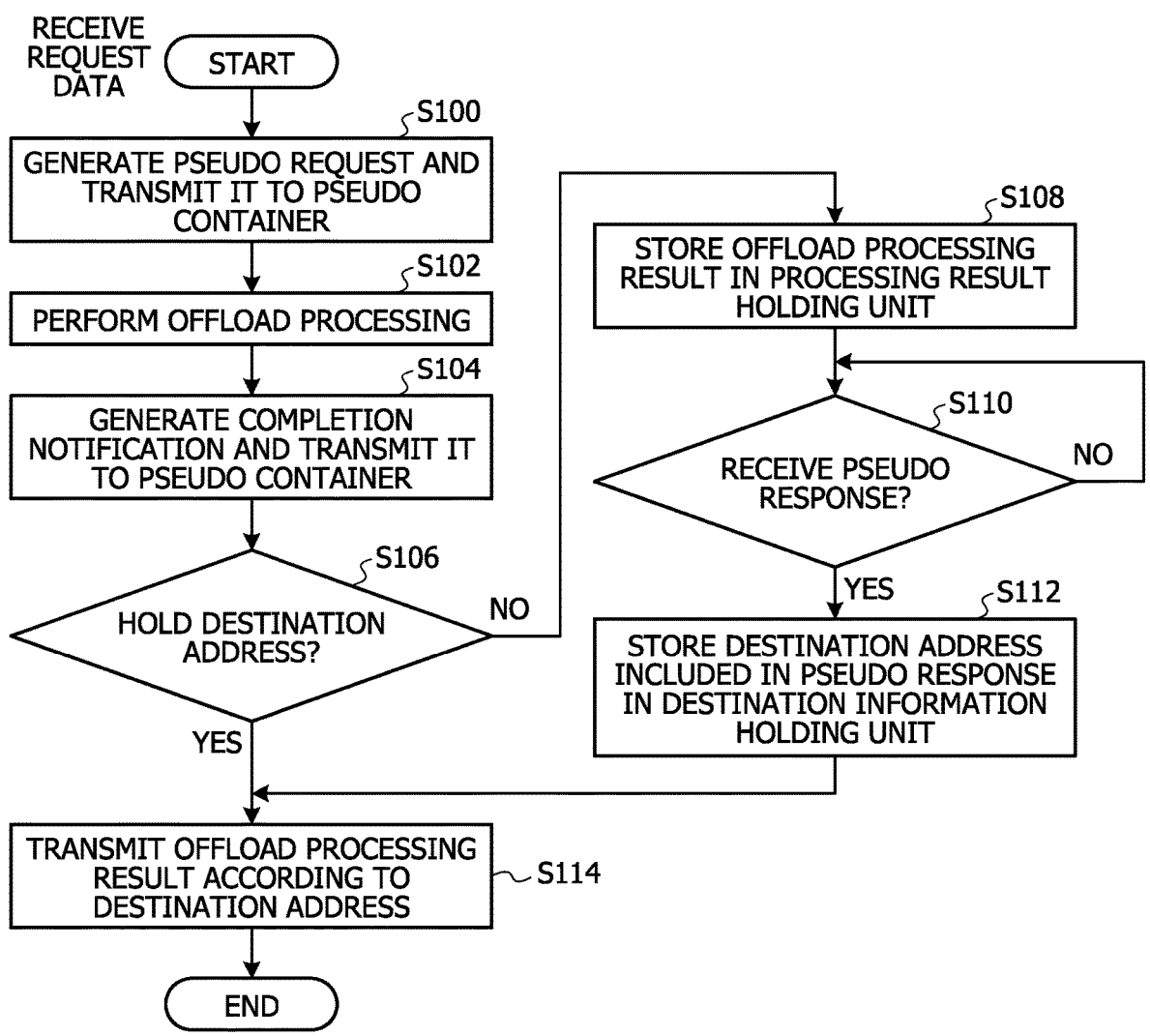
FIG. 5 is a flow diagram illustrating one example of an operation of an FPGA in FIG. 3.

FIG. 5 illustrates one example of an operation of the FPGA 220 in FIG. 3. FIG. 5 illustrates one example of a method of controlling the server 120*a*. The FPGA 220 starts the operation flow illustrated in FIG. 5 based on the reception of the request data by the communication interface unit 221.

First, in step S100, the FPGA 220 generates a pseudo request REQ and transmits the generated pseudo request REQ to the pseudo container 420. Next, in step S102, the FPGA 220 performs offload processing of the request data by the offload circuit unit 222. Note that the operations of steps S100 and S102 may be performed in reverse order or may be performed in parallel.

Next, in step S104, the FPGA 220 generates a completion notification based on the completion of the offload processing, and transmits the generated completion notification to the pseudo container 420. Next, in step S106, the FPGA 220 determines whether a destination address corresponding to the request data subjected to the offload processing is held or not in the destination information holding unit 2233. When the destination address is held in the destination information holding unit 2233, the FPGA 220 performs the operation of step S114. When the destination address is not held in the destination information holding unit 2233, the FPGA 220 performs the operation of step S108.

In step S108, the FPGA 220 stores a result of the offload processing in the processing result holding unit 2232. Next, in step S110, the FPGA 220 waits to receive the pseudo response RES from the pseudo container 420, and when receiving the pseudo response RES, performs the operation of step S112.

In step S112, the FPGA 220 stores the destination address included in the pseudo response RES in the destination information holding unit 2233, and performs the operation of step S114. In step S114, the FPGA 220 transmits the result of the offloading processing as next request data according to the destination address held in the destination information holding unit 2233, and ends the offloading processing of the request data illustrated in FIG. 5.

Figure 6:
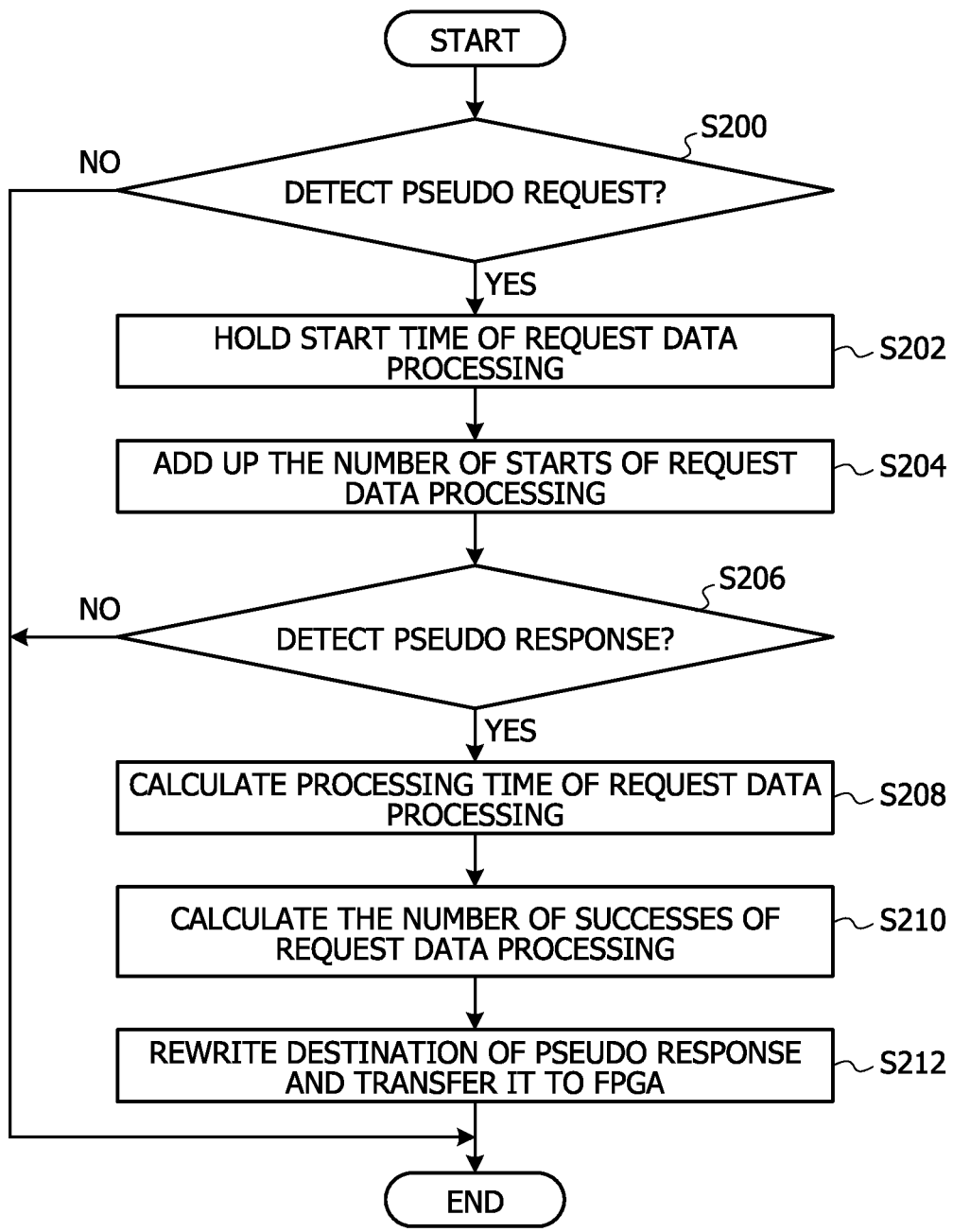
FIG. 6 is a flow diagram illustrating one example of an operation of an Envoy in FIG. 3.

FIG. 6 illustrates one example of an operation of the Envoy 320 in FIG. 3. FIG. 6 illustrates one example of the method of controlling the server 120*a*. The operation illustrated in FIG. 6 is repeatedly performed. First, in step S200, the Envoy 320 performs the operation of step S202 when detecting the pseudo request REQ, and ends the operation illustrated in FIG. 6 when detecting no pseudo request REQ.

In step S202, the Envoy 320 holds the microservice processing start time based on the detection time of the pseudo request REQ. Next, in step S204, the Envoy 320 adds up the number of microservice processing starts based on the detection of the pseudo request REQ. Note that the operations of steps S202 and S204 may be performed in reverse order or may be performed in parallel.

Next, in step S206, the Envoy 320 performs the operation of step S208 when detecting the pseudo response RES, and ends the operation illustrated in FIG. 6 when detecting no pseudo response RES.

In step S208, the Envoy 320 calculates the microservice processing time based on a difference between the detection time of the pseudo response RES and the start time held in step S202. Next, in step S210, the Envoy 320 calculates the number of microservice processing successes by adding up the number of detections of the pseudo response RES. Note that the operations of steps S208 and S210 may be performed in reverse order or may be performed in parallel.

Next, in step S212, the Envoy 320 rewrites the destination address included in the pseudo response RES, transfers the pseudo response RES in which the destination address has been rewritten to the FPGA 220, and ends the operation illustrated in FIG. 6.

FIG. 7 illustrates one example of an operation of the pseudo container 420 in FIG. 3. FIG. 7 illustrates one example of the method of controlling the server 120a. The operation illustrated in FIG. 7 is repeatedly performed.

First, in step S300, the pseudo container 420 performs the operation of step S302 when receiving the pseudo request REQ from the FPGA 220, and ends the operation illustrated in FIG. 7 when receiving no pseudo request REQ. In step S302, the pseudo container 420 stores the received pseudo request REQ in the completion notification standby unit 422.

Next, in step S304, the pseudo container 420 waits until receiving the processing completion notification CMPT from the FPGA 220. The pseudo container 420 performs step S306 when receiving the processing completion notification CMPT, and ends the operation illustrated in FIG. 7 when receiving no processing completion notification CMPT. In step S306, the pseudo container 420 generates the pseudo response RES including information such as a destination address included in the pseudo request REQ, transmits the generated pseudo response RES to the FPGA 220, and ends the operation illustrated in FIG. 7.

As described above, also in the present embodiment, it is possible to obtain an effect similar to that of the above-described embodiment. For example, by offloading a microservice processing function using request data to the FPGA 220 without mounting the microservice processing function in an application container in the virtual machine 520, it is possible to perform the processing of the microservice without the intervention of the Envoy 320.

By coupling the FPGA 220 and the pseudo container 420 via the Envoy 320, the Envoy 320 may detect the pseudo request REQ, the processing completion notification CMPT, and the pseudo response RES. Therefore, the Envoy 320 may acquire request data and information regarding the processing of the microservice.

As a result, the control plane CPL may appropriately update the control function of the service mesh, and may realize the service mesh function while suppressing the lowering of throughput in the processing of the microservice offloaded to the FPGA 220. Since it is possible to realize the service mesh function while suppressing the lowering of the processing of the microservice, it is possible to improve the processing performance of the information processing apparatus 110 and the processing performance of the information processing system included in the microservice architecture. As a result, it is possible to perform the image recognition processing and the like at high speed using the microservice, for example.

When the destination address is not held in the destination information holding unit 2233, the destination changing unit 2231 stores data after the processing of the microservice in the processing result holding unit 2232, and waits for the pseudo response RES from the pseudo application 410. Therefore, even when the microservice processing function is offloaded to the offload circuit unit 222, it is possible to acquire the destination address rewritten by the Envoy 320 and transmit next request data.

When the destination address is held in the destination information holding unit 2233, the destination changing unit 2231 may generate next request data without waiting for the pseudo response RES, and thus, it is possible to improve throughput in the processing of the microservice.

From the detailed description above, characteristics and advantages of the embodiments will become apparent. This intends that the claims cover the characteristics and advantages of the embodiments described above without departing from the spirit and the scope of the claims. Furthermore, any person having ordinary knowledge in the technical field is to be able to easily come up with various improvements and modifications. Therefore, there is no intention to limit the scope of the inventive embodiments to those described above, and the scope of the inventive embodiments may rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus included in an information processing system that employs a microservice architecture, the information processing apparatus comprising:
   a logic circuit provided with a processing function that performs processing of a microservice and a communication interface that is coupled to a network;
   a service mesh functional circuit that realizes a service mesh; and
   a pseudo application that is coupled to the logic circuit via the service mesh functional circuit and that does not have a microservice processing function,
   wherein the logic circuit starts, based on reception of request data for a data plane communication from a first other information processing apparatus by the communication interface, processing of a service that uses the request data by the processing function, generates a pseudo request for a control plane communication, transmits the generated pseudo request to the pseudo application, and transmits a processing completion notification to the pseudo application based on completion of the processing of the service by the processing function, the pseudo application transmits a pseudo response to the logic circuit based on reception of the processing completion notification after reception of the pseudo request, when detecting the pseudo response transmitted from the pseudo application to the logic circuit, the service mesh functional circuit rewrites destination information included in the pseudo response and transfers the pseudo response in which the destination information has been rewritten to the logic circuit, and the logic circuit generates, based on reception of the pseudo response that includes the rewritten destination information, request data for a next data plane communication while including the rewritten destination information in data after the processing of the service, and transmits the generated request data from the communication interface to a second other information processing apparatus.

2. The information processing apparatus according to claim 1, wherein the logic circuit includes a destination information holding memory that holds the rewritten destination information, and generates request data for a next data plane communication while including destination information held in the destination information holding memory in the data after the processing of the service without waiting for the reception of the pseudo response when destination information corresponding to the request data after the processing is held in the destination information holding memory.

3. The information processing apparatus according to claim 2, wherein the logic circuit includes a processing result holding memory that holds the data after the processing of the service, stores the data after the processing of the service in the processing result holding memory when the destination information corresponding to the request data after the processing is not held in the destination information holding memory, generates request data for a next data plane communication while including the rewritten destination information included in the pseudo response in the data after the processing of the service based on the reception of the pseudo response, and stores the rewritten destination information in the destination information holding memory.

4. The information processing apparatus according to claim 1, wherein when detecting the pseudo request transmitted from the logic circuit to the pseudo application, the service mesh functional circuit holds time of detection as start time of the processing of the service.

5. The information processing apparatus according to claim 4, wherein when detecting the pseudo response transmitted from the pseudo application to the logic circuit, the service mesh functional circuit holds time of detection as completion time of the processing of the service and calculates processing time of the service based on the completion time and the start time.

6. The information processing apparatus according to claim 1, wherein when detecting the pseudo request transmitted from the logic circuit to the pseudo application, the service mesh functional circuit adds up a number of starts of the processing of the service.

7. The information processing apparatus according to claim 6, wherein when detecting the pseudo response transmitted from the pseudo application to the logic circuit, the service mesh functional circuit adds up a number of completions of the processing of the service as a number of successes of the processing of the service.

8. An information processing system comprising a plurality of information processing apparatuses, wherein one or more of the information processing apparatuses including:

a logic circuit provided with a processing function that performs processing of a microservice and a communication interface that is coupled to a network;

a service mesh functional circuit that realizes a service mesh; and a pseudo application that is coupled to the logic circuit via the service mesh functional circuit and that does not have a microservice processing function, wherein the logic circuit starts, based on reception of request data for a data plane communication from a first other information processing apparatus by the communication interface, processing of a service that uses the request data by the processing function, generates a pseudo request for a control plane communication, transmits the generated pseudo request to the pseudo application, and transmits a processing completion notification to the pseudo application based on completion of the processing of the service by the processing function, the pseudo application transmits a pseudo response to the logic circuit based on reception of the processing completion notification after reception of the pseudo request, when detecting the pseudo response transmitted from the pseudo application to the logic circuit, the service mesh functional circuit rewrites destination information included in the pseudo response and transfers the pseudo response in which the destination information has been rewritten to the logic circuit, and the logic circuit generates, based on reception of the pseudo response that includes the rewritten destination information, request data for a next data plane communication while including the rewritten destination information in data after the processing of the service, and transmits the generated request data from the communication interface to a second other information processing apparatus.

9. A method of controlling an information processing apparatus that employs a microservice architecture and includes a logic circuit provided with a processing function that performs processing of a microservice and a communication interface that is coupled to a network, a service mesh functional circuit that realizes a service mesh, and a pseudo application that is coupled to the logic circuit via the service mesh functional circuit and that does not have a microservice processing function, wherein the method comprising:

the logic circuit starts, based on reception of request data for a data plane communication from a first other information processing apparatus by the communication interface, processing of a service that uses the request data by the processing function, generates a pseudo request for a control plane communication, transmits the generated pseudo request to the pseudo application, and transmits a processing completion notification to the pseudo application based on completion of the processing of the service by the processing function;

the pseudo application transmits a pseudo response to the logic circuit based on reception of the processing completion notification after reception of the pseudo request;

when detecting the pseudo response transmitted from the pseudo application to the logic circuit, the service mesh functional circuit rewrites destination information included in the pseudo response and transfers the pseudo response in which the destination information has been rewritten to the logic circuit; and the logic circuit generates, based on reception of the pseudo response that includes the rewritten destination information, request data for a next data plane communication while including the rewritten destination information in data after the processing of the service, and transmits the generated request data from the communication interface to a second other information processing apparatus.

* * * * *